April 28, 1942.　　　M. H. PITCHER　　　2,280,846
ROTARY PLOW
Filed May 25, 1940　　　3 Sheets-Sheet 1

INVENTOR
MILES H. PITCHER
BY
ATTORNEY

April 28, 1942.  M. H. PITCHER  2,280,846
ROTARY PLOW
Filed May 25, 1940　　3 Sheets-Sheet 2
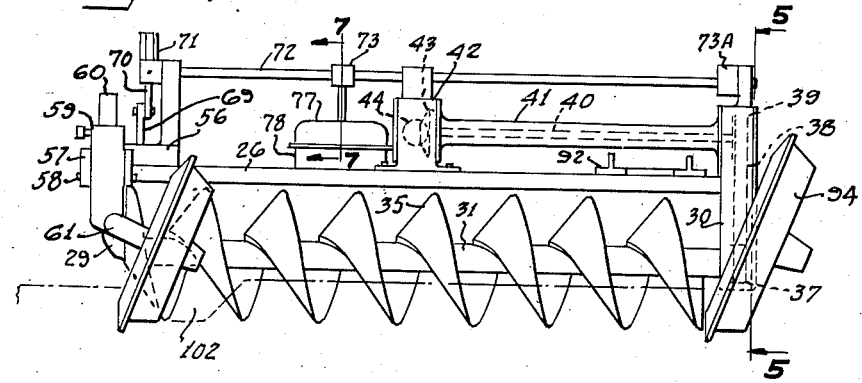
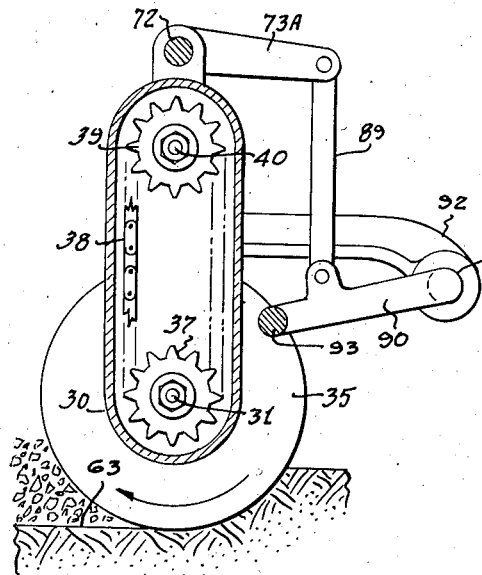
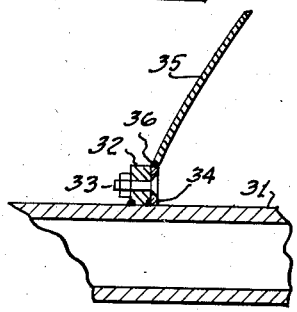
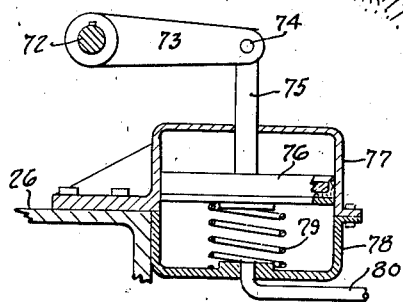
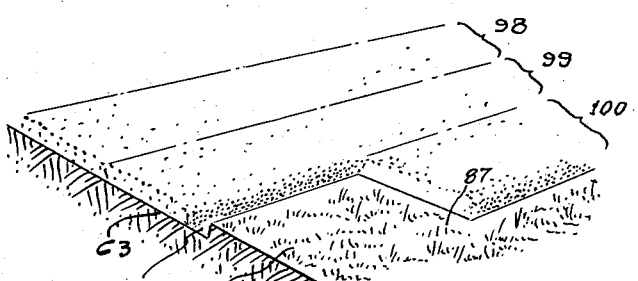
INVENTOR
MILES H. PITCHER
BY
ATTORNEY

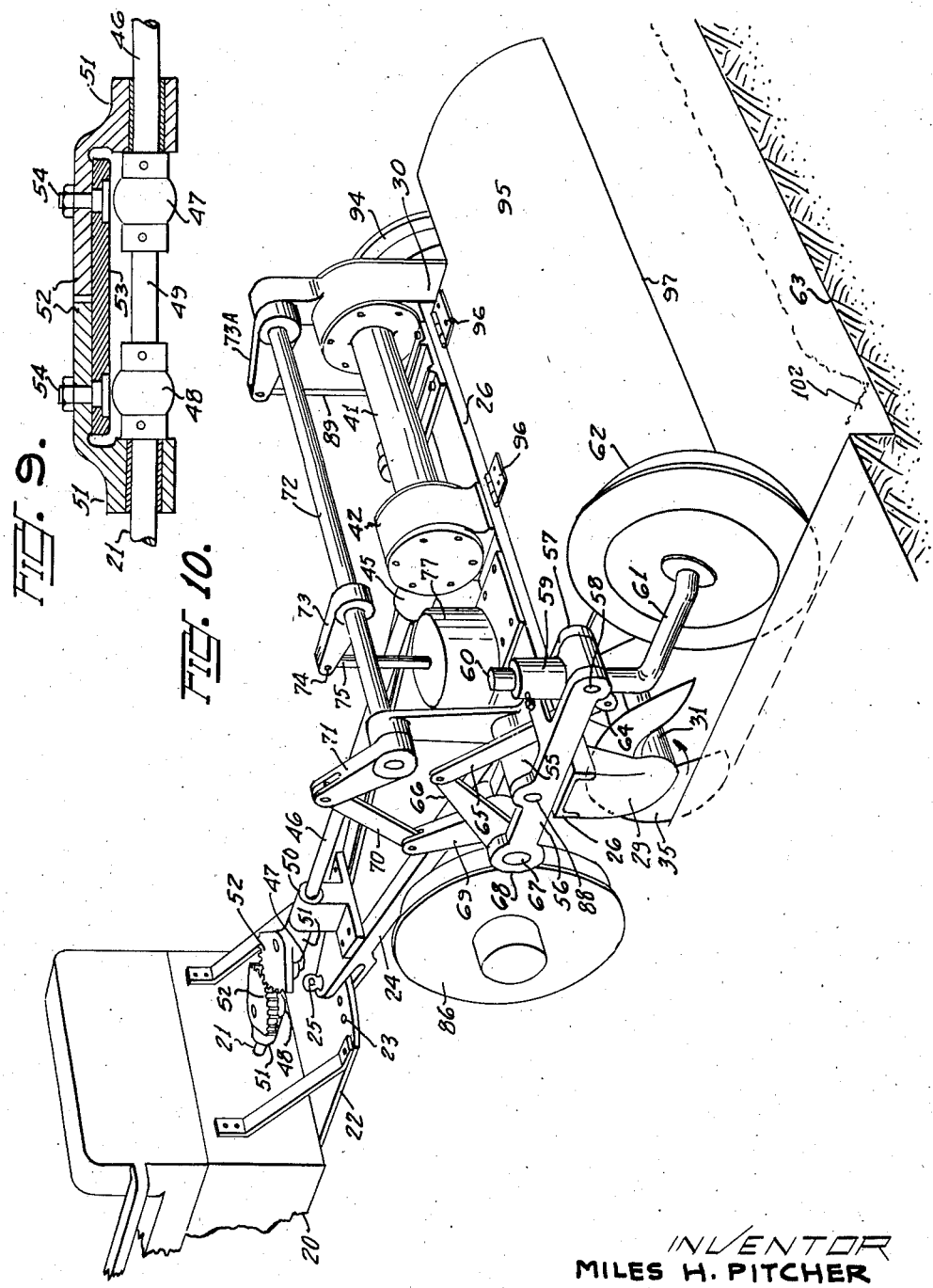

Patented Apr. 28, 1942

2,280,846

UNITED STATES PATENT OFFICE 2,280,846

ROTARY PLOW

Miles H. Pitcher, Portland, Oreg.

Application May 25, 1940, Serial No. 337,242

4 Claims. (Cl. 97—41)

This invention relates generally to agricultural implements, and particularly to a rotary plow.

The main object of this invention is to construct an improved form of rotary plow of the type illustrated in the Bagan Patent No. 1,776,612, which will completely till the soil at one operation whereby sods and trash are cut to pieces, the soil thoroughly pulverized and aerated and the surface of the tilled soil rendered smooth and uniform ready for seeding or planting.

The second object is to construct a plow of the class described wherein side draft will be entirely eliminated.

The third object is to construct a plow of the class described which will be easy to maneuver and which will have a tendency to level the surface of the ground every time the plow passes over it.

The fourth object is to construct a plow of the class described which can be used for various purposes, such as roadbuilding, ditching, diking and levelling.

These and other objects are accomplished in the manner set forth in the following specification as illustrated in the accompanying drawings, in which:

Fig. 4 is a rear elevation of the plow from which the shield has been removed.

Fig. 5 is a vertical section taken along the line 5—5 in Fig. 4.

Fig. 6 is a fragmentary longitudinal section through the plow helix showing the construction thereof.

Fig. 7 is a section taken along the line 7—7 in Fig. 4.

Fig. 8 is a perspective view of a piece of ground showing the condition of the soil after successive plowing operations.

Fig. 9 is a section taken along the line 9—9 in Fig. 1.

Fig. 10 is a perspective view of the complete plow.

Similar numerals refer to similar parts throughout the several views.

Figure 1:
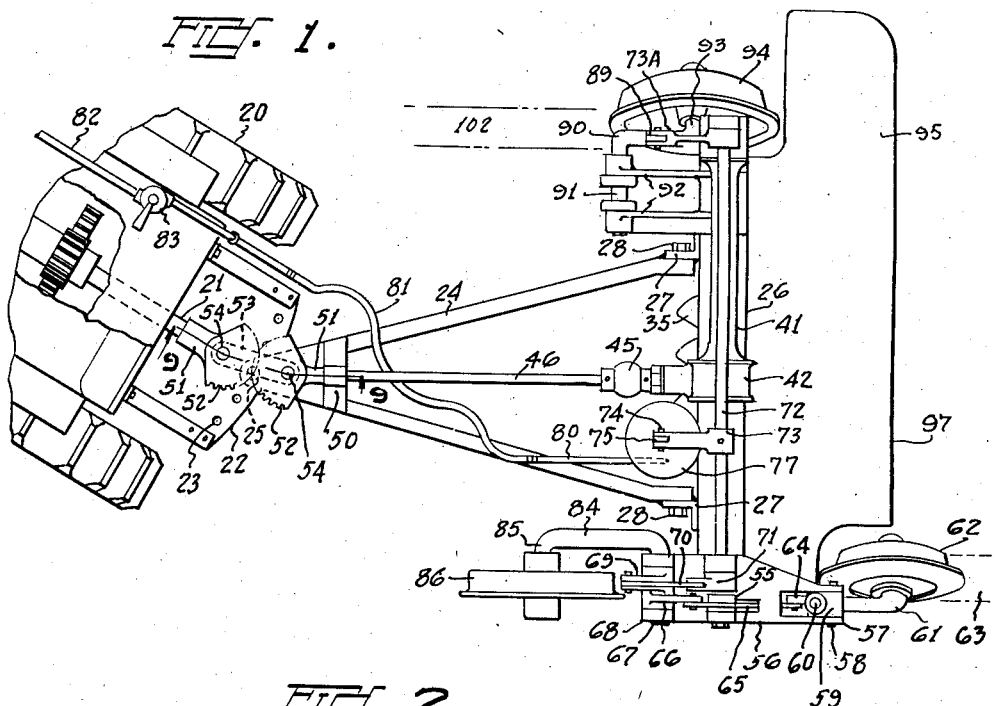
Fig. 1 is a plan of the device showing a portion of the tractor.
Figure 2:
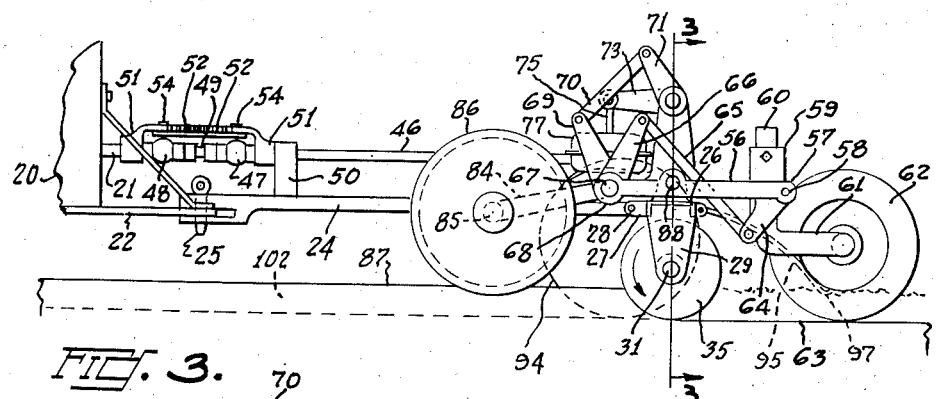
Fig. 2 is a side elevation of the device.
Figure 3:
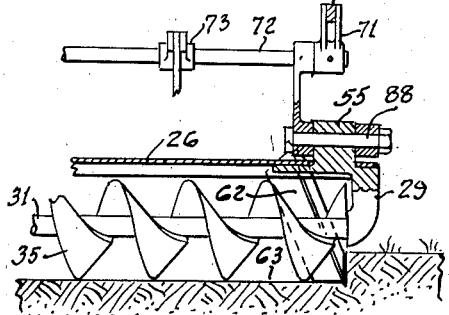
Fig. 3 is a vertical section taken along the line 3—3 in Fig. 2.

Referring in detail to the drawings, there is shown the conventional form of tractor 20 having the usual power take-off shaft 21 and draw bar plate 22, the latter of which is provided with perforations 23 to the central one of which is attached the V-shaped draw bar 24 of the plow by means of the pin 25. The draw bar 24 is attached to the transverse channel 26 by means of the brackets 27 to which the draw bar 24 is rigidly attached by means of the bolts 28. It is desirable to also weld the parts 24 and 27 together.

Extending downwardly from the channel bar 26 are the standards 29 and 30 between which journals the tubular shaft 31 upon which is welded or integrally formed therewith a spiral shoulder 32 to which is secured by means of the plow bolts 33 the innermost portion 34 of the helical plow screw 35 which for convenience in manufacture is welded to the portion 34 along the edge 36. It will be noted that the plow screw 35 is somewhat concave in shape in a radial direction to facilitate the plowing action and absorb the unequal stretching of the metal in the helix along its radial cross-section.

On one end of the shaft 31 is secured a sprocket wheel 37 which is connected by a chain 38 to the sprocket wheel 39 on the transfer shaft 40 which extends through the tubular housing 41 to the central housing 42 within which is disposed the bevel gear 43 which is secured on the shaft 40 and meshes with the bevel pinion 44 which is connected by means of the universal joint 45 to the shaft 46, which in turn is connected to the universal joints 47 and 48 to the power take-off shaft 21. The joints 47 and 48 are connected by a stub shaft 49. The shaft 46 is supported by a standard 50 which is mounted on the draw bar 24. On opposite sides of the joints 47 and 48 are the sleeves 51, on each of which is formed a segment gear 52. These gears mesh with each other. A tie link 53 connects the bolts 54 disposed at the centers of the gears 52 and maintains the gears in a meshing relationship. The purpose of this construction is to reduce the angularity between the shafts 21, 46 and 49. That is, the driving angle between the shaft 49 and either of the shafts 46 or 21 remains the same at all times which causes the angle between either shaft 46 or 21 and the shaft 49 to be more nearly in a straight line than is the angle between the shafts 21 and 46.

On one of the standards 29 is formed an upturned lug 55 on which is rockably mounted the beam 56 through whose forked rearward end 57 extends a pivot bolt 58 upon which is rockably mounted the spindle housing 59 in which is disposed the spindle 60 whose lower end 61 is turned backwardly and inwardly to receive the flanged wheel 62 which rides on the bottom 63 of the new furrow being formed by the screw 35.

A rocking movement is applied to the housing 59 by means of a lever 64 which is attached thereto. The lever 64 is connected by means of the link 65 to the lever 66 which is secured to the crank shaft 67 which in turn journals in the end 68 of the beam 56. Motion is applied to the crank shaft 67 by means of a lever 69 which is connected by means of a link 70 to the arm 71 which is secured on the rock shaft 72. The rock shaft 72 has secured thereon an arm 73 which is connected by the pin 74 to the piston rod 75 of the piston 76 which is disposed within the cylinder 77 whose lower end 78 encloses a spring 79.

The cylinder 77 is mounted on the channel bar 26. The lower end 78 of the cylinder 77 is connected by means of the pipe 80 and hose 81 to the pipe 82 communicating with the intake manifold of the motor of the tractor 20. A manually controlled valve 83 within reach of the operator is placed in the line between the pipe 82 and the hose 81.

When the valve 83 is opened and the atmospheric pressure below the piston 76 is lowered, it follows that the piston 76 will descend drawing with it the arm 73 causing it to rock the shaft 67 in a manner to move its arm 84 downwardly. Since the arm 84 carries on its end 85 a ground engaging wheel 86 which rests upon the unplowed ground 87 into which it will not normally descend, it follows that there is an upward force exerted against the shaft 67.

Since the shaft 67 is mounted on the beam 56 which in turn can rock on the bolt 88 and the beam 56 fulcrums on the pivot bolt 58, then the plow screw 35 will be correspondingly elevated. This action is increased by the action of the members 64, 65 and 66 which exert a similar lifting action at the rearmost end of the beam 56.

It will be noted that the shaft 72 through the arm 73A exerts a downward thrust through the link 89 against the crank arm 90 whose crank shaft 91 journals in the arms 92 which are secured to the channel bar 26. The end 93 carries the ground engaging wheel 94 which rides on the bottom 63 of the furrow.

Over the plow screw 35 is mounted a shield or ground levelling guard 95 which is attached by means of the hinges 96 to the channel bar 26. The shield 95 may be raised to give access to the plow screw 35 or lowered to the position shown in Fig. 10 in which the edge 97 serves to level the surface of the tilled ground and place same in condition for planting.

The operation of the plow is as follows:

Assuming that a tract of land is to be plowed, the tractor 20 is driven across same with a plow attached behind it and through the power take-off shaft 21 rotary motion is provided for the plow screw 35 causing it to cut away the earth and thoroughly disintegrate the soil, sod and trash.

It will be noted that when a downward force is exerted against the wheels 62, 86 and 94 that an upward force is exerted against the plow screw 35 causing it to be raised out of the ground or lowered into the ground as the suction is removed from the underside of the piston 76.

It will be seen that while the tractor 20 draws the plow from the pin 25, that the angularity between the power transmitting shafts 21 and 46 is divided by the gears 52 thereby reducing the angularity of drive through the universal joints 47 and 48.

It will also be noted that since the wheel 62 rides on the bottom 63 of the furrow that any irregularities encountered by the wheel 86 are divided thereby tending to smooth out the contour of the ground at each succeeding plowing operation.

In some forms of the device instead of employing the power lift illustrated in Fig. 7, the various lifting actions are performed manually as is the common practice in various types of plows now in common use.

In Fig. 8 is shown a representative form of plowing operation in which the successive rows 98, 99, and 100 represent successful passing of the plow, whereas the area 101 represents the unplowed soil. It will be noted in this figure that the dirt is moved laterally toward the plowed land leaving a slight furrow 102 at one side of the plowing strip, this furrow 102 being filled by the laterally moving earth at the next passing of the plow.

I claim:

1. In a plow of the class described a three wheeled vehicle having two wheels in tandem and one wheel transversely opposite and intermediate the tandem wheels, a frame supported at one end behind said intermediate wheel and at the other end by means of a rockable beam disposed between said tandem wheels, crank arms attached to the ends of said beam, the rearmost crank arm having a castor action and forming the axle for the rearmost tandem wheel, the foremost crank arm having the foremost tandem wheel attached thereto and means for rocking said crank arms for the purpose of adjusting the height of said frame above the ground, a helical plow screw mounted under said transverse frame and means for driving said plow screw from the power take-off shaft of the tractor.

2. A rotary plow having in combination a three wheeled land travelling vehicle, two of whose wheels are in tandem and the third wheel being disposed to one side of the tandem wheels and intermediate the axes thereof, a frame supported by said wheels, a draw bar hinged to said frame and pivotally connected to the draw bar plate of the tractor, a beam supporting one end of said frame between said tandem wheels, means for adjustably supporting said beam upon said tandem wheels, the rearmost tandem wheel having a castor action, and a plow screw rotatably suspended under said frame.

3. The apparatus described in claim 2, together with a pneumatic actuating mechanism for adjusting the height of said frame with relation to the ground.

4. A plow of the class described consisting of a three wheeled land travelling vehicle whose foremost wheel rides on the land, whose intermediate wheel rides in the right hand furrow and whose rearmost wheel rides in the left hand furrow and is provided with a castor action, said vehicle having a frame which is vertically adjustable with relation to its wheels, a helical plow screw suspended from said frame, a transfer shaft rotatably mounted on said frame, a driving connection from one end of said transfer shaft to one end of said plow screw, a driving connection from the second end of said transfer shaft to the power take-off of a tractor, and means for varying the elevation of said plow screw with relation to a plane passing through the points of support for the vehicle wheels.

MILES H. PITCHER.